United States Patent
Virsik et al.

(10) Patent No.: US 10,624,340 B2
(45) Date of Patent: Apr. 21, 2020

(54) CHEMICAL COMBINATIONS FOR ATTRACTING VESPIDAE

(71) Applicants: Kathleen Grace Virsik, Portola Valley, CA (US); Peter Andrew Virsik, Portola Valley, CA (US)

(72) Inventors: Kathleen Grace Virsik, Portola Valley, CA (US); Peter Andrew Virsik, Portola Valley, CA (US)

( * ) Notice: Subject to any disclaimer, the term of this patent is extended or adjusted under 35 U.S.C. 154(b) by 0 days.

(21) Appl. No.: 15/878,418

(22) Filed: Jan. 24, 2018

(65) Prior Publication Data
US 2018/0220648 A1 Aug. 9, 2018

Related U.S. Application Data

(60) Provisional application No. 62/453,522, filed on Feb. 2, 2017.

(51) Int. Cl.
| | |
|---|---|
| *A01N 37/36* | (2006.01) |
| *A01N 37/02* | (2006.01) |
| *A01N 25/18* | (2006.01) |
| A01N 25/00 | (2006.01) |
| A01N 37/00 | (2006.01) |

(52) U.S. Cl.
CPC .......... *A01N 37/36* (2013.01); *A01N 25/18* (2013.01); *A01N 37/02* (2013.01); *A01N 25/00* (2013.01); *A01N 37/00* (2013.01)

(58) Field of Classification Search
None
See application file for complete search history.

(56) References Cited

U.S. PATENT DOCUMENTS 6,083,498 A 7/2000 Landolt

FOREIGN PATENT DOCUMENTS

EP 2287089 A1 * 2/2011 .......... A01M 1/2033

OTHER PUBLICATIONS

El-Sayed et al. "Attraction and antennal response of the common wasp, *Vespula vulgaris* (L.), to selected synthetic chemicals in New Zealand beech forests" Pest Manag Sci 2009; vol. 65: pp. 975-981 (Year: 2009).*

Wegner et al. "Comparison of Three Liquid Lures for Trapping Social Wasps" J. Econ. Entomol.,2005, vol. 98: pp. 664-666 (Year: 2005).*

Landolt et al. "Discovery and Development of Chemical Attractants Used to Trap Pestiferous Social Wasps", J Chem Ecol., vol. 42:pp. 655-665, 2016 (Year: 2016).*

Day S.E. Food Volatiles as Attractants for Yellowjackets (Hymenoptera: *Vespidae*), Environ. Entomol., 2001, 30(2): 157-165.

El-Sayed A.M. Attraction and antennal response of the common wasp to selected synthetic chemicals in New Zealand beech forests, Pest Manag Sci, Sep. 2009;65(9):975-81.

Landolt P. Discovery and Development of Chemical Attractants Used to Trap Pestiferous Social Wasps (Hymenoptera: *Vespidae*), J Chem Ecol. Jul. 2016;42(7):655-65.

Landolt P. Trapping yellowjackets with heptyl butyrate from controlled release dispensers. J Econ Entomol. Dec. 2000;93(6):1613-8.

Landolt P. Chemical attractants for trapping Yellowjackets *Vespula germanica* and *Vespula pensylvania*. Phys and Chem Ecology. 1998,(62), 1229-1234.

Richter M.R., Social Wasp (Hymenoptera: *Vespidae*) Foraging Behavior, Annu. Rev. Entomol. 2000, 45:121-150.

Spurr E.B. Carbohydrate bait preferences of wasps in New Zealand, New Zealand Journal of Zoology,1996, vol. 23:315-324.

Haikkinen S.A.K., Effect of Inorganic sales on the volatility of organic acids, Environ Sci Technol. 2014, 48,13718-13726.

Wegner G.S. Comparison of three liquid lures for trapping social wasps, J Econ Entomol. 2005,98(3):664-666.

Citric Acid Safety Data Sheet, Sigma Aldrich, Version 6.4, Revision Date Sep. 18, 2019.

Acetic Acid Safety Data Sheet, Avantor, Version 1.4, Revision Date Sep. 30, 2019.

Citric Acid Safety Data Sheet, Surpass Chemical Company, Version 1, Revision Date Sep. 11, 2019.

Sodium Citrate Safety Data Sheet, Millipore Sigma, Version 6.1, Revision Date Jun. 16, 2019.

* cited by examiner

Primary Examiner — James W Rogers

(57) ABSTRACT

Methods and compositions of attractants are described which provide vapor blends of citric acid, malic acid or tartaric acid and one or more compounds selected from the group consisting of isobutanol, racemic 2-methyl-1-butanol, S-(−)-2-methyl-1-butanol, 2-methyl-2-propanol, butyl butyrate, hexyl butyrate, heptyl butyrate, octyl butyrate and nonyl butyrate which function as highly effective attractants for yellowjacket wasps and other types of vespidae. By attracting wasps to traps or baits, the chemical attractants provide a means for detecting, surveying, monitoring, capturing, trapping and controlling the wasps.

7 Claims, No Drawings

CHEMICAL COMBINATIONS FOR ATTRACTING VESPIDAE

BACKGROUND

Yellowjackets (including *V. pensylvanica, V. germanica* and *V. vulgaris*) and other members of the wasp family, Vespidae, are widely found across North America and are considered to be pests when they interact with humans. Schools, swimming pools, parks, picnic areas, and homes can all be negatively impacted by Vespidae, and many people can suffer from allergic reactions, some of which can be fatal. One of the more nuisance forms of Vespidae is the genus of *Vespula*, including various species of yellowjackets. Since most yellowjacket colonies begin new nests each season, managing their populations can be a challenge. Most pest management techniques for Vespidae involve trapping of Vespidae as they forage, but often these techniques do not adequately address the pest issue.

The life cycle of most Vespidae nests begins in winter, when fertilized Vespidae queens go into hibernation. Queens may hibernate in covered natural locations such as tree stumps, hollow logs, the ground and also in man-made structures. In the spring, the queen will emerge, search for a new nest location, build a nest, and begin laying her eggs. After the initial eggs hatch into larvae, the queen feeds her young with scavenged meat, fish and other insects. As adults, these first offspring are sterile female workers that expand the nest, search for food and care for the queen and her young. After her first generation matures, the queen remains inside the nest laying eggs for the rest of the summer. The diet of most Vespidae including yellowjackets varies throughout the season and includes both fruit-based sugars and nectars as well as proteins including meat, fish and insects. At its height, a colony may contain 5,000 or more worker wasps.

In the fall, nests will contain larvae ready to become adult males and fertile females. These males and females will leave their colonies to mate. After mating, males die and the fertilized females go in search of hibernation locations. Worker wasps perish in winter, leaving the hibernating queen to begin anew in spring.

Most current trapping methods for Vespidae involve setting traps in perimeters surrounding areas and filling the traps with attractants of Vespidae. Controlling populations of Vespidae such as *V. pensylvanica* is difficult due to the size and location of the nests. However, the use of traps against these Vespidae is a common method of reducing their interactions with humans. Usually, these liquid-drowning or dehydration traps contain one or more chemical attractants. Frequently, this includes synthetic heptyl butyrate (HB), a commonly-used yellowjacket lure which is highly attractive to *V. pensylvanica* and other species of Vespidae including *V. atripilosa, V. sulphurea, V. consobrina, V. acadica, V. squamosa, V. vidua, V. vulgaris, V. maculifrons,* and *V. germanica*. Other butyric acid ester attractants related to heptyl butyrate which are also known to be attractants to similar Vespidae include butyl butyrate, hexyl butyrate, octyl butyrate and nonyl butyrate (EI-Sayed A M et al. 2009; McGovern et al. 1970). Isobutanol, 1-methyl-1-butanol and 2-methyl butanol are also known to be a attractants of other yellowjacket species (Landolt. 2016).

In some commercial traps, a combination of isobutanol, 1-methyl-butanol or 2-methyl-1-butanol or 2-ethyl-1-butanol and acetic acid are used together with heptyl butyrate to enhance the attraction to certain yellowjacket and wasp species including a hornet (*Vespa crabro*) and several paper wasps (*Polistes* spp.) (U.S. Pat. No. 6,083,498). It was found that while 2-methyl-1-butanol is similarly effective as isobutanol when used with acetic acid to attract various Vespidae, it has a more favorable vapor pressure than isobutanol (Landolt P. 2000; Landolt 2016). While these traps can effectively trap some Vespidae, the efficacy of the traps is largely dependent upon attractants to lure these Vespidae to them. As a result, the effectiveness of the traps is directly related to the effectiveness of the attractants.

Herein are described novel compositions of heptyl butyrate and other volatile attractants along with specific acids that are used in combination to create novel compositions of attractants which are more effective at attracting yellowjackets and other Vespidae than the volatile attractants on their own. Importantly, these enhanced combination of attractants are not attractive to honey bees or other beneficial insects.

REFERENCES

Day et. al. Environmental Entomology April 2001: Vol. 30, Issue 2, pg(s) 157-165.
El-Sayed A M et al. Pest Manag Sci. 2009 September; 65(9):975-81.
Landolt Petal. J Chem Ecol. 2016 July; 42(7):655-65.
Landolt P et el. Florida Entomologist. September 2003: 86(3):323-328.
Landolt P J, Smithhisler C S, Reed H C, McDonough LM. J Econ Entomol. 2000 December; 93(6):1613-8.
McGovern, T. P., H. G. Davis, M. Beroza, J. C. Ingangi, and G. W. Eddy. 1970. 63:1534-1536.
U.S. Pat. No. 6,083,498

DETAILED DESCRIPTION OF THE INVENTION

This invention comprises specific attractants for yellowjackets and wasps, and provides a means for detecting, surveying, monitoring, and controlling these pests. Vespidae ("Vespidae") shall mean the family of insects including the subfamily of Vespinae and the genus of *Vespula*. In particular, Vespidae includes but is not limited to the species of *V. acadica, V. consobrina, V. pensylvanica, V. germanica, V. vulgaris, V. atropilosa, V. squamosal, V. sulphurea, V. vidua, V. maculifrons, Dolichovespula arenia* and *Dolichovespula maculata*.

Most current trapping methods for Vespidae involve setting traps in perimeters surrounding areas and filling the traps with attractants of Vespidae. Controlling populations of Vespidae such as *V. pensylvanica* is difficult due to the size and location of the nests. However, the use of traps against these Vespidae is a common method of reducing their interactions with humans. Usually, these liquid-drowning or dehydration traps contain one or more chemical attractants. Frequently, this includes synthetic heptyl butyrate (HB), a commonly-used yellowjacket lure which is highly attractive to *V. pensylvanica* and other species of Vespidae including *V. atripilosa, V. sulphurea, V. consobrina, V. acadica, V. squamosa, V. vidua, V. vulgaris, V. maculifrons,* and *V. germanica*. Other butyric acid ester attractants related to heptyl butyrate which are also known to be attractants to similar Vespidae include butyl butyrate, hexyl butyrate, octyl butyrate and nonyl butyrate (EI-Sayed A M et al. 2009; McGovern et al. 1970). Isobutanol and the related alcohols, 1-methyl-1-butanol and 2-methyl butanol, are also known to be a attractants of other yellowjacket species (Landolt. 2016).

The synthetic attractant composition of the invention comprises a vapor blend or vapor mixture of (I) citric acid, malic acid or tartaric acid and the vapor of (II) one or more compounds selected from the group consisting of isobutanol, racemic 2-methyl-1-butanol, S-(−)-2-methyl-1-butanol, butyl butyrate, hexyl butyrate, heptyl butyrate, octyl butyrate and nonyl butyrate in an effective attractant amount. An effective amount of an attractant vapor blend of I and II is defined as that quantity of the chemical blend that attracts Vespidae to the location of the blend at a rate higher than wasps are attracted to a location devoid of the blend. An effective attractant amount is determined as the quantities of the compounds emitted from a formulation or dispenser holding the compounds that is sufficient to elicit an attraction response from Vespidae downwind of the attractant vapor blend or mixture.

All of the compounds for producing the vapor composition of the invention are commercially available. Group I compounds have low vapor pressures and are not volatized sufficiently for humans to generally smell their odors. However, the odor sensing ability of Vespidae allow them to sense extremely small amounts of compounds in the air. Sufficient amounts of Group I vapors can be volatized via dissolution into a volatile agent such as water or other known volatile liquids capable of dissolving the acids. Known volatile forms include aqueous and glacial (concentrated) forms of each acid. Alternatively, the agents can be volatized by a chemical agent which, when it degrades, releases a small amount of the acid.

The attractant vapor composition may be provided by (a) a mixture of I and II; (b) a combination of I and II wherein I and II are positioned in sufficient proximity to each other to form a volatilized blend of I and II. In all cases, whether I and II are formulated or presented separately or together, I and II are provided so as to provide an effective attractant amount of the odor blend of I and II.

Lures. It is envisioned that the chemical attractants of the invention would be useful in detecting, surveying, monitoring, or controlling Vespidae when used as a lure. A lure includes a dispenser which contains a chemical or chemicals which provide the attractant vapor blend. For purposes of this invention, a dispenser is defined as any container which both (a) contains or holds the unvolatilized compound or compounds used to produce the vapor blend of I and II and (a) releases the compound or compounds in the vapor phase to form the vapor blend of I and II.

A dispenser may take several forms. For example, it may be dispensed via an adsorbent material such as cotton or paper which holds both and releases I or II and which can be the same adsorbent material or separate adsorbent material within the trap. In general, however, a dispenser will comprise a reservoir for holding an amount of a compound either within a space or a polymeric matrix, with the release into the atmosphere controlled by a permeable wall or membrane or by a small opening surrounded by an impermeable wall or membrane. Examples of dispensers include a reservoir and polyethylene cap within a trap. Further examples of dispensers include polymer caps, bubbles, hollow fibers, hollow tubes, bags or tubing which release compounds through the walls, capillary tubing which release compounds out of an opening in the tubing, polymeric blocks of different shapes which release compounds out of the polymer matrix, membrane systems which hold the chemicals within an impermeable container and release them through a measured permeable membrane, and combinations of the foregoing. Examples of other dispensers are polymer laminates, polyvinyl chloride pellets, polyethylene bags, microcapillaries, and Shunitzu rope. Another dispenser uses microencapsulation techniques to encapsulate each compound used to produce the vapor blend.

In one embodiment, I and II are formulated as a mixture and placed in the dispenser. In another embodiment, the compound that produces citric acid, malic acid or tartaric acid vapor is provided in a first dispenser and the compound or compounds that produce vapor of component II is placed in a second dispenser, and the two dispensers are placed in sufficient proximity to one another to form a volatilized blend of I and II in the surrounding atmosphere. The first and second dispensers may optionally be attached or fused to form one device or unit that releases I and II to form the vapor blend. Alternatively, I and II may be formulated separately, for example, placing citric acid in a drowning solution and placing a compound of group II in separate area of the trap. Compounds from groups I and II may also be blended into the drowning solution.

Controlled release of the compounds may also be effected in part through the addition of an extender such as mineral oil, which will reduce the rate of volatilization of the odorants out of the dispenser.

The lures may be combined with feeding stimulants, such as meat-based baits like chicken or tuna, to provide baits for Vespidae. Toxicants, such a fipronil, may also be added to provide poisoned baits. Other compounds and materials may be added to a formulation, lure, bait or trap provided they do not substantially interfere with the attractancy of the attractant vapor composition of the invention. Whether or not an additive substantially interferes with the attractant activity can be determined by standard test formats, involving direct comparisons of efficacy of the blend without an added compound and the blend with an added compound. Reductions in attractancy, such as reduced captures of Vespidae in traps baited with the attractant with the additive, may be determined with standard statistical analyses.

Trapping Systems. The attractants of the invention may be used as detecting agents, surveying agents, monitoring agents, or control agents for Vespidae. Conveniently, the attractants are dispensed within a trap to attract and trap Vespidae. A trapping system for monitoring or controlling Vespidae includes a trap, and a dispenser located within the trap but which provides an effective attractant amount of a vapor blend of (I) citric acid, malic acid or tartaric acid and vapor of (II) one or more compounds selected from the group consisting of isobutanol, racemic 2-methyl-1-butanol, S-(−)-2-methyl-1-butanol, butyl butyrate, hexyl butyrate, heptyl butyrate, octyl butyrate and nonyl butyrate. A trap means any device for catching insects, particularly, Vespidae including yellowjackets and paper wasps. These traps may include for example, the yellow jacket trap described in U.S. Pat. Nos. 5,557,880; 5,522,172; 5,501,033; 5,339,563; 4,858,374; 4,794,724; 4,551,941; 4,348,449; 4,179,252; 4,064,206; and 3,803,753 which are incorporated herein by reference. Other traps include the Trappit dome trap by Agrisense, Final Flight® Yellowjacket wasp trap by Troy Bioscience (Phoenix, Ariz.), Liquidator Trap by Phero Tech Inc., Yellow Jacket Wasp Trap by Oak Stump Farm (U.S. Pat. No. 4,794,724), Rescue® Yellowjacket Trap by Sterling International (U.S. Pat. No. 4,551,941) and the WHO® Trap by Sterling international.

A preferred trap is one which has a mixing chamber wherein vapors of I and II form a blend and the vapor blend of I and II exits the trap chamber and attracts wasps to the chamber where they are trapped and dehydrated. Compounds I and II that produce the attractant vapor blend may be presented as a mixture or in separate dispensers within the trap. Compounds I and II may be added directly to a drowning solution that can be used in a trap, with the attractant blend emanating from the drowning solution. Compound I can be initially put into this drowning area as a powder which is then filled with an appropriate liquid in addition to a compound selected from Compound II. This drowning solution may optionally contain additional materials that aid in the capture and killing of attracted wasps, such as detergents or wetting agents, clays, dyes and toxicant, as long as such additives do not substantially interfere with the attractiveness of the attractant blend of the invention. Alternatively, the trap may have a separate drowning area wherein compound I is or is not present, and a separate dispending area where a combination of Compound I and II may be located. For dry traps, in which attracted Vespidae are killed by isolation, a preferred trap attracts the Vespidae to the trap, wherein they enter the trap, but cannot find an exit and dehydrate.

Means for Controlling Vespidae. The attractants of the invention are useful for control of Vespidae when used in concert with traps for controlling wasps. Control of wasps may be carried out as known in the art, including (a) by capturing the wasps in traps, (b) by capturing wasps in a trap and killing the wasps, for example, by means of a drowning solution, or (c) by use of toxicants, pesticides or chemosterilants, (d) by use of poisoned bait, e.g., the combination of a feeding stimulant and toxicant, that the wasps will take back to the nest and feed to the brood and queen, effectively killing off the colony.

A toxicant may be in a powdered form or incorporated into a bait as a liquid or other form whereby the Vespidae becomes attracted to the toxicant and becomes contaminated or infected (in the case of pathogens) with the toxicant or carries the toxicant back to the nest where it is spread throughout the nest and eradicates the members of the colony. Toxicants which may be useful in this invention are those which will not adversely affect the attractiveness of the attractants of the invention. A variety of matrix materials may also be employed as a carrier for the toxicant.

Combination of Attractant and Visual Target. For purposes of trapping or baiting, visual targets may be used to focus close range orientation of attracted wasps, either to facilitate their being captured in traps or to facilitate their arrival on a bait. For example, some species of Vespidae are optimally attracted to the color yellow, and some species are attracted to small dark objects which they will contact.

Kits and Packaged Attractants. The invention is also directed to kits. In one aspect, the kit includes a trap and a lure for use within the trap and which provides the attractant vapor blend. The kit may also include a drowning solution for some trap designs. Another kit includes two components, wherein component is citric acid, malic acid, or tartaric acid and the other component is one or more compounds selected from the group consisting of isobutanol, racemic 2-methyl-1-butanol, S-(−)-2-methyl-1-butanol, 2-methyl-2-propanol, butyl butyrate, hexyl butyrate, heptyl butyrate, octyl butyrate, and nonyl butyrate. The components may be in a drowning solution, formulation (chemical matrix to hold and release one or more attractant chemicals), dispenser or bait as discussed above. Drowning solutions, formulations, dispensers and controlled release devices may be rechargeable with a measured amount of I and II.

A bait kit may contain the compounds to provide the attractant blend of the invention in a matrix or suitable carrier for Vespidae to contact and remove. The bait may also contain additives, such as feeding stimulants, toxicants, extenders, antioxidants, and/or UV absorbers.

The invention is also directed to a packaged attractant which comprises two components, wherein one component is one that provides citric acid, malic acid, or tartaric acid vapor and the other component is one or more compounds selected from the group consisting of isobutanol, racemic 2-methyl-1-butanol, S-(−)-2-methyl-1-butanol, 2-methyl-2-propanol, butyl butyrate, hexyl butyrate, heptyl butyrate, octyl butyrate, and nonyl butyrate, wherein the components are packaged in separate containers and wherein the packaged attractant further comprises instructions for producing a volatilized blend of the two components when the components are released from the containers.

EXAMPLES

The following examples are intended only to further illustrate the invention and are not intended to limit the scope of the invention which is defined by the claims.

Example 1

The following example describes attractant experiments conducted to evaluate single-agent chemicals as attractants for Vespidae present locally in San Mateo County, Calif. and was conducted in July 2016.

Materials and Methods. The first experiment evaluated heptyl butyrate, isobutanol, butyric acid, citric acid, ethanol, lactic acid, turkey broth, and acetic acid as baits for Vespidae. Heptyl butyrate was included for comparison because of its known attractiveness to *V. pensylvanica* (Davis et al., 1969, Supra).

Attraction Measurements. Testing the efficacy of attraction of the chemicals was conducted using an apparatus that allows visualization of the vespidae to an area with the attractant. This can be prepared in a variety of ways including the use of white 4-sided boxes in which the different attractants are placed at the bottom of the box. Attraction of the Vespidae to the boxes is visualized and Vespidae are counted when they fly into the plane of the box toward the attractant. Each experiment lasted 15 minutes and every 5 minutes, the boxes would be cleared of Vespidae and rotated counterclockwise to eliminate any possible effect of direction. Each experiment was conducted two times over the course of one day, for a total of 6 replicates per test chemical. Boxes were prepared using white paper (one foot square) and applying them to equal sizes of cardboard to create a 4-sided box with the white paper in the inside of the box. Boxes were placed in a triangle pattern on the ground and spaced equally three to four feet apart. Disposable plates with clipped-on absorbent material on them were placed in the bottom on the boxes. Each tested attractant was poured onto the absorbent material on the plate and placed into a testing box.

Chemical Treatments. Seven chemical treatments were selected and compared to heptyl butyrate as baits for yellowjackets. Chemicals tested included heptyl butyrate, acetic acid (5%), butyric acid, citric acid solution (14 grams in 10 mL of water), ethanol (40%), isobutanol, lactic acid, and turkey broth. Turkey Broth was prepared by putting 40 grams of ground turkey in a bowl with 50 mL of water, microwave for 2.5 minutes, let sit for 30 minutes, microwave for ten seconds every ten minutes for an additional 30 minutes. Strain it through a filter. Experiment 1 used 500 µL of each test agent combined for a total of 1000 µL total volume in east test. The heptyl butyrate test used 500 µL of water and 500 µL of heptyl butyrate.

In a prior experiment before Example 1 that was also conducted in June 2016 in San Mateo county (results not shown), different concentrations of citric acid and acetic acid were examined in a similar format to Experiment 1 but without rotation of the boxes. In this prior experiment, the concentrations from a 0.2% to a 5% solution for acetic acid and from a 30 mM to a 750 mM solution of citric acid. Based upon similar results seen regarding attraction of Vespidae, the highest concentration (5% acetic acid and 750 mM citric acid) of each of these solutions was used in Experiment 1.

Results. In the first experiment, the total number of Vespidae attracted across the two tests for acetic acid, lactic acid, butyric acid, and citric acid was 2, 5, 5, 10, respectively. The total number of Vespidae attracted across the two tests for ethanol & isobutanol was 2 and 21, respectively. The total number of Vespidae attracted across the two tests for turkey broth was 71. The total number of Vespidae across the two tests for heptyl butyrate was 343. No bees were attracted to any of the above test agents and the predominant species of Vespidae attracted was *V. pensylvanica* (Table 1).

TABLE 1

Total Number of Vespidae Attracted to Single Test Agents

| Test Agent | Sum Test 1 + 2 |
|---|---|
| Acetic Acid (AA) | 2 |
| Lactic Acid (LA) | 5 |
| Butyric Acid (BA) | 5 |
| Citric Acid (CA) | 10 |
| Ethanol | 2 |
| Isobutanol (I) | 21 |
| Turkey Broth (TB) | 71 |
| Heptyl Butyrate (HB) | 343 |

Example 2

The following example describes attractant experiments conducted to evaluate combinations of chemical agents as attractants for Vespidae present locally in San Mateo County, Calif. that were conducted in July of 2016.

Materials and Methods. The second experiment evaluated combinations of heptyl butyrate with isobutanol, turkey broth, butyric acid, citric acid, lactic acid and acetic acid solution as baits for Vespidae. Heptyl butyrate was included for comparison because of its known attractiveness to *V. pensylvanica* (Davis et al., 1969, Supra).

Attraction Measurements. Testing the efficacy of attraction of the chemicals was conducted using an apparatus that allows visualization of the Vespidae to an area with the attractant. This can be prepared in a variety of ways including the use of white 4-sided boxes in which the different attractants are placed at the bottom of the box. Attraction of the Vespidae to the boxes is visualized and Vespidae are counted when they fly into the plane of the box toward the attractant. Each experiment lasted 15 minutes and every 5 minutes, the boxes would be cleared of Vespidae and rotated counterclockwise to eliminate any possible effect of direction. Each experiment was conducted two times over the course of one day, for a total of 6 replicates per test chemical. Boxes were prepared using white paper (one foot square) and applying them to equal sizes of cardboard to create a 4-sided box with the white paper in the inside of the box. Boxes were placed in a triangle pattern on the ground and spaced equally three to four feet apart. Disposable plates with clipped-on absorbent material on them were placed in the bottom on the boxes. Each tested attractant was poured onto the absorbent material on the plate and placed into a testing box.

Chemical Treatments. Six chemical treatments were selected and combined with heptyl butyrate and compared to heptyl butyrate alone as baits for Vespidae. Chemicals combined with heptyl butyrate included acetic acid (5%), butyric acid, citric acid solution (14 grams in 10 mLs of water), isobutanol, lactic acid, and turkey broth. Set concentrations were used for acetic acid of 5% and 750 mM for citric acid. Butyric acid and lactic acid were liquid solutions and used at 100% strength. Turkey Broth was prepared by putting 40 grams of ground turkey in a bowl with 50 mL of water, microwave for 2.5 minutes, let sit for 30 minutes, microwave for ten seconds every ten minutes for an additional 30 minutes. Strain it through a filter. Experiment 2 used 500 µL of each test agent for a total of 1000 µL total volume in each test. The heptyl butyrate test used 500 µL of water and 500 µL of heptyl butyrate.

Results. In the second experiment, the total number of Vespidae attracted to the combination of heptyl butyrate and acetic acid was 73 Vespidae, compared to heptyl butyrate alone at 95 Vespidae (23% lower than heptyl butyrate alone). The total number of Vespidae attracted to the combination of heptyl butyrate and lactic acid was 72 Vespidae, compared to 76 for heptyl butyrate (5% lower than heptyl butyrate alone). The total number of Vespidae for the combination of heptyl butyrate and butyric acid was 17, compared to 84 Vespidae for heptyl butyrate alone (80% lower than heptyl butyrate alone). The total number of Vespidae attracted to the combination of heptyl butyrate and citric acid was 126 Vespidae, compared to 79 for heptyl butyrate alone (59% higher than heptyl butyrate alone). The total number of Vespidae attracted to a combination of heptyl butyrate and isobutanol was 27 Vespidae, compared to heptyl butyrate with an average of 59 (54% lower than heptyl butyrate alone). The total number of Vespidae attracted to a combination of heptyl butyrate and turkey broth was 114 Vespidae, compared to 85 Vespidae for heptyl butyrate alone (34% higher than heptyl butyrate alone). (Table 2). No bees were attracted to any of the above test agents and the predominant species of Vespidae attracted was *V. pensylvanica*.

TABLE 2

Total Number of Vespidae Attracted to Combinations of Attractants

| | Test Combination | Heptyl Butyrate | Difference | Percent Difference |
|---|---|---|---|---|
| Lactic Acid & Heptyl Butyrate | 72 | 76 | −4 | −5% |
| Isobutanol & Heptyl Butyrate | 27 | 59 | −32 | −54% |
| Butyric Acid & Heptyl Butyrate | 27 | 84 | −67 | −80% |
| Turkey Broth & Heptyl Butyrate | 114 | 85 | 29 | 34% |
| Acetic Acid & Heptyl Butyrate | 73 | 95 | −22 | −23% |
| Citric Acid & Heptyl Butyrate | 126 | 79 | 47 | 59% |

Experiment 3

The following example describes attractant experiments conducted to evaluate combinations of chemical agents as attractants for Vespidae present locally in San Mateo County, Calif. that were conducted in July of 2017.

Materials and Methods. The third experiment evaluated combinations of heptyl butyrate and citric acid, malic acid, and tartaric acid versus heptyl butyrate alone as baits for Vespidae. Heptyl butyrate was included for comparison because of its known attractiveness to *V. pensylvanica* (Davis et al., 1969, Supra).

Attraction Measurements. Testing the efficacy of attraction of the chemicals was conducted using an apparatus that allows visualization of the Vespidae to an area with the attractant. This can be prepared in a variety of ways including the use of white 4-sided boxes in which the different attractants are placed at the bottom of the box. Attraction of the Vespidae to the boxes is visualized and Vespidae are counted when they fly into the plane of the box toward the attractant. Each experiment lasted 15 minutes and every 5 minutes, the boxes would be cleared of Vespidae and rotated counterclockwise to eliminate any possible effect of direction. Each experiment was conducted three times over the course of one day, for a total of 9 replicates per test.

Boxes were prepared using white paper (one foot square) and applying them to equal sizes of cardboard to create a 4-sided box with the white paper in the inside of the box. Boxes were placed in a triangle pattern on the ground and spaced equally three to four feet apart. Disposable plates with clipped-on absorbent material in them were placed in the bottom on the boxes. Each tested combination of attractants was poured onto the absorbent material on the plate and placed into a testing box.

Chemical Treatments. Four chemical treatments were selected and combined with heptyl butyrate and compared to heptyl butyrate alone as baits for Vespidae. Chemicals combined with heptyl butyrate included citric acid solution (5 grams in 50 mLs of water), malic acid (6 grams in 50 mLs of water), and tartaric acid (7 grams in 50 mLs of water). Experiment 3 used 500 µL of each test agent combined for a total of 1000 µL total volume in each test. The heptyl butyrate test used 500 µL of water and 5004 of heptyl butyrate.

Results. In the third experiment, the total number of Vespidae attracted to the combination of heptyl butyrate and citric acid was 672 Vespidae, compared to 477 Vespidae for heptyl butyrate alone (41% higher than heptyl butyrate alone) and 22 Vespidae for citric acid. The total number of Vespidae attracted to the combination of heptyl butyrate and malic acid was 472 Vespidae, compared to 355 Vespidae for heptyl butyrate alone (33% higher than heptyl butyrate alone) and 19 Vespidae for malic acid. The total number of Vespidae attracted to the combination of heptyl butyrate and tartaric acid was 355 Vespidae, compared to 590 Vespidae for heptyl butyrate alone (40% lower than heptyl butyrate alone) and 15 Vespidae for tartaric acid. (Table 3). No bees were attracted to any of the above test agents and the predominant species of Vespidae attracted was *V. pensylvanica*.

TABLE 3

Total Number of Vespidae Attracted to Different Test Conditions

| Test Condition | Total Number of Vespidae |
| --- | --- |
| Citric Acid Alone | 22 |
| Heptyl Butyrate Alone | 477 |
| Citric Acid + Heptyl Butyrate | 672* |
| Percent Change | 41% |
| Malic Acid Alone | 19 |
| Heptyl Butyrate Alone | 355 |
| Malic Acid + Heptyl | 472* |

TABLE 3-continued

Total Number of Vespidae Attracted to Different Test Conditions

| Test Condition | Total Number of Vespidae |
| --- | --- |
| Butyrate | |
| Percent Change | 33% |
| Tartaric Acid Alone | 15 |
| Heptyl Butyrate Alone | 590 |
| Tartaric Acid + Heptyl Butyrate | 355* |
| Percent Change | -40% |

*P < 0.05 compared to heptyl butyrate alone using a Two-Sample t-Test

Experiment 4

The following example describes trapping experiments conducted to evaluate combinations of chemical agents as attractants for Vespidae present locally in San Mateo County, Calif. that was conducted Jul. 23, 2017 through Aug. 6, 2017.

Materials and Methods. The fourth experiment evaluated combinations of heptyl butyrate and citric acid, malic acid, and tartaric acid versus heptyl butyrate alone as baits for Vespidae. Heptyl butyrate was included for comparison because of its known attractiveness to *V. pensylvanica* (Davis et al., 1969, Supra).

Attraction Measurements. Testing the efficacy of attraction of the chemicals was conducted using four standard commercially-available RESCUE Reusable Yellowjacket® traps filled with the various test agents. In this experiment, the traps were set and hung 5-6 feet off of the ground with all traps separated by 3-4 feet from one another. Chemical treatments were added to the attractant chambers (cotton absorbant material) of the trap and hung for 14 days. Measurements of the number of trapped Vespidae were made on day 15.

Chemical Treatments. Four chemical treatments were selected and combined with heptyl butyrate and compared to heptyl butyrate alone as baits for Vespidae. Chemicals combined with heptyl butyrate included citric acid solution (5 grams in 50 mLs of water), malic acid (6 grams in 50 mLs of water), and tartaric acid (7 grams in 50 mLs of water). Experiment 4 used 2 mL of the standard attractant (heptyl butyrate) as is found in the RESCUE reusable yellowjacket traps for the heptyl butyrate alone test. Each of the combination of test agents used 2 mL of heptyl butyrate along with 2 mL of the specific acid solution.

Results. In the fourth experiment, the total number of Vespidae trapped with the combination of heptyl butyrate and citric acid was 213 Vespidae (134% higher than heptyl butyrate alone), heptyl butyrate and malic acid was 111 Vespidae (22% higher than heptyl butyrate alone), heptyl butyrate and tartaric acid was 160 Vespidae (76% higher than heptyl butyrate alone) and heptyl butyrate was 91 on its own (Table 4).

While one bee was trapped during the experiment, the predominant species of trapped Vespidae were *V. pensylvanica* (>99%).

TABLE 4

Total Number of Vespidae Trapped During a 14-Day Test

| Test Condition | Total Number of V. Pensylvanica | vs. Heptyl Butyrate |
|---|---|---|
| Citric Acid + Heptyl Butyrate | 213 | 134% |
| Tartaric Acid + Heptyl Butyrate | 160 | 76% |
| Malic Acid + Heptyl Butyrate | 111 | 77% |
| Heptyl Butyrate | 91 | N/A |

In one embodiment, the invention describes a method of enhancing the attraction of yellowjackets and other wasps in the Family Vespidae to physical traps by utilizing chemical attractants combining a volatile attractant taken from heptyl butyrate or isobutanol along with one or more fruit-based acids taken from citric acid, malic acid, tartaric acid, and glycolic acid.

In another embodiment, the invention describes a method wherein the volatile chemical attractant is heptyl butyrate and the fruit-based acid is citric acid.

In another embodiment, the invention describes a method wherein the volatile chemical is heptyl butyrate and the fruit-based acid is malic acid.

In another embodiment, the invention describes a method wherein the volatile chemical is isobutanol and the fruit-based acid is malic acid.

In another embodiment, the invention describes a method wherein the volatile chemical is isobutanol and the fruit-based acid is citric acid.

In another embodiment, the invention describes a composition for attracting yellowjackets and other wasps in the Family Vespidae comprising a combination of a volatile attractant and one or more fruit-based acids.

In another embodiment, the invention describes a composition wherein the volatile chemical attractant is heptyl butyrate and the fruit-based acid is citric acid.

In another embodiment, the invention describes a composition wherein the volatile chemical is heptyl butyrate and the fruit-based acid is malic acid.

In another embodiment, the invention describes a composition wherein the volatile chemical is isobutanol and the fruit-based acid is malic acid.

In another embodiment, the invention describes a composition wherein the volatile chemical is isobutanol and the fruit-based acid is citric acid.

SUMMARY OF THE INVENTION

Yellowjackets (including *V. pensylvanica*, *V. germanica* and *V. vulgaris*) and other members of the wasp family, Vespidae, are widely found across North America and are considered to be pests when they interact with humans. Schools, swimming pools, parks, picnic areas, and homes can all be negatively impacted by Vespidae, and many people can suffer from allergic reactions, some of which can be fatal. One of the more nuisance form of Vespidae are the genus of *Vespula*, including various species of yellowjackets. Since most yellowjacket colonies begin new nests each season, managing their populations can be a challenge. Most pest management techniques for Vespidae involve trapping of Vespidae as they forage, but often these techniques do not adequately address the pest issue.

The present invention is directed to attracting yellowjackets, hornets and wasps, which comprises placing into an area where yellowjackets, hornets and wasps are to be attracted, a dispenser which provides an effective attractant amount of a vapor blend of (I) one or more compounds selected from the group consisting of citric acid, malic acid and tartaric acid and the vapor of (II) one or more compounds selected from the group consisting of isobutanol, racemic 2-methyl-1-butanol, S-(−)-2-methyl-1-butanol, butyl butyrate, hexyl butyrate, heptyl butyrate, octyl butyrate and nonyl butyrate.

In one embodiment, the vaporized blend is provided by a dispenser containing a mixture of I and II. In another embodiment, the vapor is provided by separate dispensers but which are in sufficient proximity to provide said vapor blend of I and II.

In another embodiment, the dispenser contains citric acid and said vapor blend comprises vapors of citric acid and heptyl butyrate. In another embodiment, the dispenser contains malic acid and said vapor blend comprises vapors of malic acid and heptyl butyrate. In another embodiment, the dispenser contains tartaric acid and said vapor blend comprises vapors of tartaric acid and heptyl butyrate.

One object of the invention is to use group I and II attractants to lure yellowjackets, hornets and wasps into a trap for yellowjackets, hornets and wasps. This can be done as a means for controlling yellowjackets, hornets and wasps. A further object of the invention is the use of the attractants of the invention for use with control agents, including drowning solutions, insecticides, biological control agents, or other toxicants, to attract and combat this pest.

Another objective of the invention is to create a composition for attracting yellowjackets, hornets and wasps, which consists essentially of a vapor blend of vapor of (I) one or more compounds selected from the group consisting of citric acid, malic acid and tartaric acid and the vapor of (II) one or more compounds selected from the group consisting of isobutanol, racemic 2-methyl-1-butanol, S-(−)-2-methyl-1-butanol, butyl butyrate, hexyl butyrate, heptyl butyrate, octyl butyrate and nonyl butyrate.

In one embodiment, the composition contains citric acid and said vapor blend comprises vapors of citric acid and heptyl butyrate. In another embodiment, the composition contains malic acid and said vapor blend comprises vapors of malic acid and heptyl butyrate. In another embodiment, the composition contains tartaric acid and said vapor blend comprises vapors of tartaric acid and heptyl butyrate.

One objective of the invention is to create a kit for attracting and trapping yellowjackets, hornets and wasps, which comprises two or more components, wherein one component is citric acid or malic acid and the other component is heptyl butyrate. Another objective of the invention is to create a packaged attractant comprising two or more components, wherein one component is citric acid or malic acid and the other component is heptyl butyrate, wherein said components are packaged in separate containers and wherein said packaged attractant further comprises instructions for producing a volatilized blend of said two components when said components are released from said containers.

Another objective of the invention is to determine an attractant composition for yellowjackets, hornets and wasps, which comprises a vapor blend of (I) one or more compounds selected from the group consisting of citric acid, malic acid and tartaric acid and the vapor of (II) heptyl butyrate and the vapor of (III) acetic acid and the vapor of (IV) 2-methyl-1-butanol wherein said composition provides an effective yellowjacket, hornet and wasp attractant amount of said vapor blend of I, II, III and IV.

Another objective of the invention is to determine a method of attracting yellowjackets, hornets and wasps, which comprises a vapor blend of (I) one or more compounds selected from the group consisting of citric acid, malic acid and tartaric acid and the vapor of (II) heptyl butyrate and the vapor of (III) acetic acid and the vapor of (IV) 2-methyl-1-butanol wherein said composition provides an effective yellowjacket, hornet and wasp attractant amount of said vapor blend of I, II, III and IV.

Another object of the invention is the use of effective methods of monitoring or controlling yellowjackets or paper wasps using the chemical attractants of the invention. A further object of the invention is the use of trapping systems for trapping yellowjackets, hornets or wasps which include traps and an effective attractant amount of the attractant combination of the invention.

The invention claimed is:

1. A method for attracting vespids which comprises dispensing into an area where vespids are to be attracted, a vespid-attracting amount of compounds I and II, wherein compound I is selected from the group consisting of citric acid, malic acid and tartaric acid; and compound II is heptyl butyrate.

2. The method of claim 1 wherein said vespid-attracting amount of said compounds is provided by a dispenser which contains a mixture of compounds I and II.

3. The method of claim 1 wherein said vespid-attracting amount of said compounds is provided by a dispenser comprising a first dispenser which contains compound I and a second dispenser which contains compound II, wherein said first and second dispensers are in close proximity to one another.

4. The method of claim 1 wherein compound I comprises citric acid and compound II comprises heptyl butyrate.

5. The method of claim 1 including trapping said attracted vespids.

6. A method of attracting vespids, which comprises dispensing into an area where vespids are to be attracted, a vespid-attracting amount of (I) a compounds selected from the group consisting of citric acid, malic acid and tartaric acid; (II) heptyl butyrate; (III) acetic acid; and (IV) 2-methyl-1-butanol.

7. A method for attracting vespids, which comprises dispensing into an area where vespids are to be attracted, a vespid-attracting amount of (I) a compound selected from the group consisting of malic acid and tartaric acid; and (II) heptyl butyrate.

* * * * *